Jan. 4, 1955     B. K. HOLLISTER     2,698,508
FRUIT PICKING DEVICE
Filed March 5, 1953
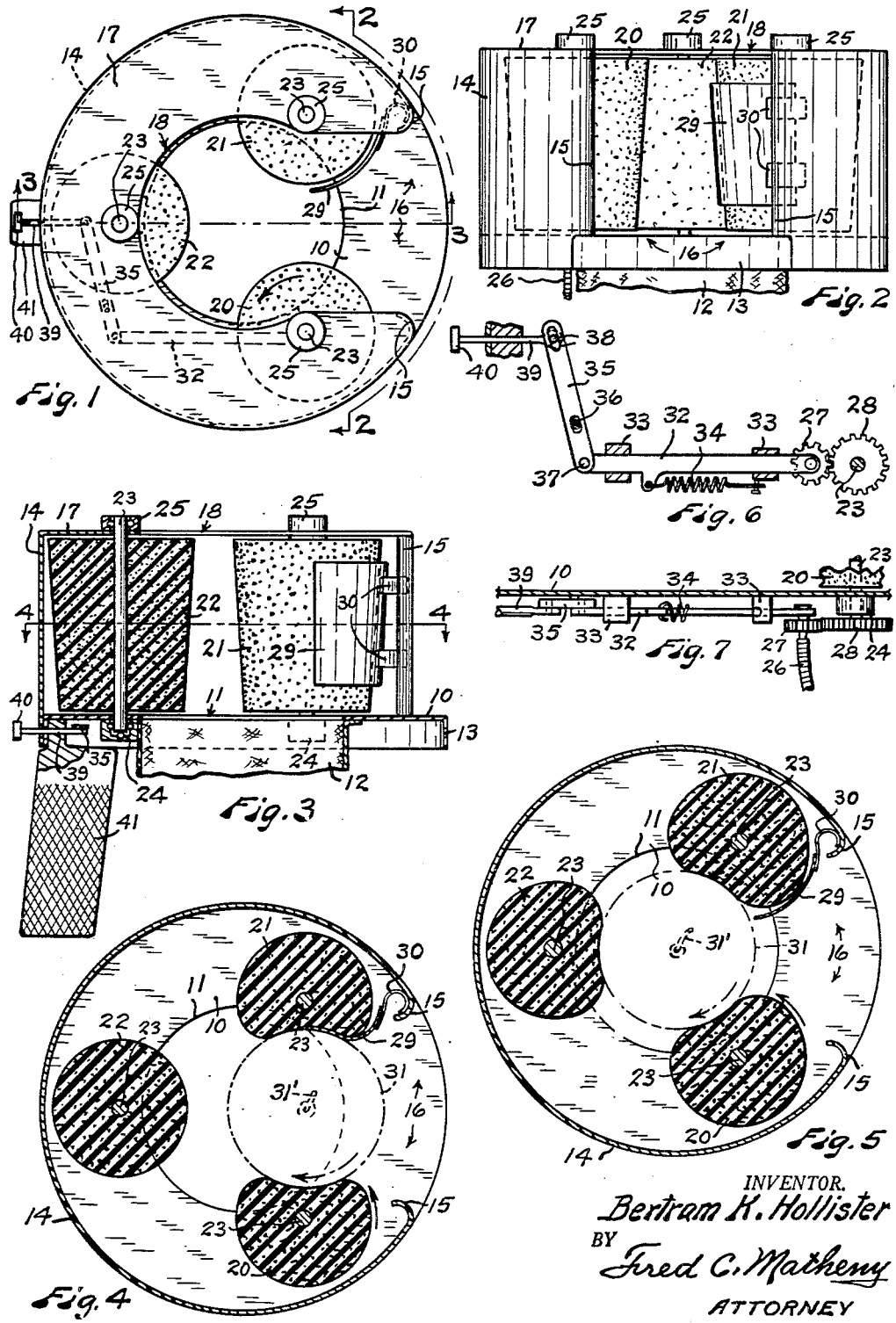
INVENTOR.
Bertram K. Hollister
BY
Fred C. Matheny
ATTORNEY

United States Patent Office 2,698,508
Patented Jan. 4, 1955

2,698,508
FRUIT PICKING DEVICE
Bertram K. Hollister, Seattle, Wash.
Application March 5, 1953, Serial No. 340,429
8 Claims. (Cl. 56—332)

This invention relates to fruit picking devices and an object of this invention is to provide simple and efficient power operated means for removing fruit from trees without danger of bruising or injuring the fruit.

Another object is to provide a fruit picking device which will remove fruit from trees by mechanically twisting the stem which connects the fruit with the tree.

Another object is to provide a fruit picking device which is small and compact in construction and which can be conveniently held in one hand and readily manipulated and moved among the branches of a tree to reach and pick the fruit in the tree.

Another object of the invention is to provide a simple, compact and efficient fruit picking device which embodies a plurality of rollers of highly compressible material positioned to receive and impart a turning movement to fruit, at least one of said rollers being driven.

Another object is to provide a fruit picking device embodying frame and housing means having a normally horizontal base portion provided with an opening through which fruit may pass, a plurality of tapered rollers of highly compressible material rotatively mounted on axes perpendicular to said base portion and positioned in spaced apart relation around said opening with their smaller ends adjacent said base portion, two of said spaced apart rollers being fruit intake rollers between which fruit may be taken into the picking device, one of said fruit intake rollers being driven and the other fruit intake roller having a flexible shield covering a portion of its surface, said shield immobilizing said other fruit intake roller and providing a non-rotatable support for the fruit as the fruit is being taken into the picking device.

Other objects of the invention will be apparent from the following description taken in connection with the accompanying drawings.

Figure 1 is a top plan view of a fruit picking device constructed in accordance with this invention.

Fig. 2 is a front elevation of the same looking in the direction of broken line 2—2 of Fig. 1, parts being broken away.

Fig. 3 is a view partly in section and partly in elevation taken substantially on broken line 3—3 of Fig. 1.

Figure 4 is a view partly in section and partly in plan taken substantially on broken line 4—4 of Fig. 3, showing this fruit picking device applied to an apple with the apple entering the picking device, the apple being shown by dot and dash lines.

Fig. 5 is a view similar to Fig. 4 showing the apple entirely within the picking device in a position it may occupy just before it discharges from the picking device.

Fig. 6 is an enlarged fragmentary plan view, with parts in section, showing roller driving means and control devices for the same.

Fig. 7 is an elevation, with parts in section and parts broken away of the roller driving and control means shown in Fig. 6.

Like reference numerals designate like parts throughout the several views.

This device comprises a flat, preferably circular, base 10 of strong light weight material, such as an aluminum alloy, having a relatively large centrally positioned opening 11 through which fruit may pass downwardly into a tubular fruit disposal chute 12. The chute 12 is secured to the base 10 and may extend to any desired location to which the fruit is to be delivered. Preferably this chute 12 is formed of soft pliable material, such as a pliable plastic, and this chute will serve to slow down the descent of the fruit and will not bruise or injure the fruit. The base 10 is preferably provided with a downwardly extending marginal flange 13 which forms a receptacle under the base for mechanism hereinafter described.

An annular housing 14 is rigidly secured to the marginal flange portion of the base 10 and extends upwardly therefrom. The annular housing wall 14 preferably extends around the base 10 for about three hundred degrees and terminates in inwardly curved edge portions 15 which are spaced apart far enough to leave a fruit inlet opening about sixty degrees in extent, this fruit inlet opening being indicated by 16 and being large enough to admit the fruit for which the picking device is intended.

An annular cover of approximately U shape is provided on the top of the housing 14. This cover 17 has a relatively large central opening 18 extending from the curved edge portions 15 of the housing 14 inwardly and positioned above the fruit inlet opening 16 and the fruit discharge opening 11. A plurality of tapered rollers 20, 21 and 22 of soft and highly compressible material and which has a high coefficient of friction, such as sponge rubber, are rotatively mounted above the base 10 in spaced apart relation around the discharge opening 11. Preferably the rollers 20, 21 and 22 are secured to axial spindles or shafts 23 which are journaled in lower bearings 24 rigid with the base 10 and upper bearings 25 rigid with the annular cover plate 17. Preferably the bearings 24 and 25 are of a ball or roller type. At least some of the rollers 20, 21 and 22 are tapered frustoconically and have their smaller ends positioned adjacent the base 10. This downwardly convergent taper of the rollers 20, 21 and 22 causes fruit to drop out of or discharge downwardly from these rollers more readily as soon as the stem of the fruit is detached or twisted loose from the branch or twig to which it has been attached.

The two rollers 20 and 21 are positioned at opposite sides of the fruit intake opening 16 and function as fruit intake rollers. One of these fruit intake rollers, such as the roller 20 is driven, as from a flexible driving shaft 26, which is connected by gears 27 and 28 with the axle 23 of said roller 20, Figs. 6 and 7. The other fruit intake roller 21 is a non-driven roller.

A flexible shield or guard member 29 is secured, as by flat metal springs 30 to the inwardly curved edge portion 15 of the housing 14 adjacent the non-driven roller 21. This shield 29 may be made of thin flexible material, such as plastic, which has some stiffness but is capable of conforming to the shape of generally spherical fruit without injuring the fruit. An apple 31 having a stem 31′ is indicated by dot and dash lines in Figs. 4 and 5. The shield 29 serves to immobilize the non-driven roller 21 while fruit is being drawn into the picking device by the rotation of the driven roller 20.

Preferably devices are provided for quickly disconnecting the driving means from the roller 20. One way to accomplish this is to mount the smaller gearwheel 27, to which the flexible shaft 26 is connected, on a longitudinally movable bar 32. The bar 32 is slidably supported in brackets 33 and is urged toward the larger gearwheel 28 by a spring 34. A lever arm 35 is fulcrumed on a pin 36 which is rigid with the base 10 and has one end connected by a pivot 37 with the bar 32. The other end of the lever arm 35 is connected as by slot and pin means 38 with a slidably supported push rod 39 which has a button 40 on its outer end. Obviously the spring 34 will tend to hold the gearwheel 27 in mesh with the gearwheel 28 but the gearwheel 27 may be retracted out of mesh with the gearwheel 28 by exerting a push on the rod 39.

A pistol grip type handle 41 is rigidly secured to the base 10 and extends downwardly therefrom in a convenient position to be grasped by the hand of a user. Thus the device can be held in one hand and conveniently applied to the fruit to be picked.

The downwardly extending flange 13 on the base 10 strengthens and stiffens the base and also houses the gears 27 and 28 and parts connected therewith.

When this device is in use the roller 20 is driven in the direction indicated by the arrows in Figs. 1, 4 and 5. The picking device is held in the hand and is applied to the fruit by positioning the roller 20 and shield 29 against the fruit. The rotating roller 20 frictionally engages the fruit, such as an apple 31, and rolls the same over the shield or guard member 29 through a position as indicated in Fig. 4 and into the space between the three rollers 20, 21, and 22, as shown in Fig. 5. The U shaped cover 17 provides ample clearance through which the stem 31' of the fruit may pass as the fruit is taken into the picking device. The fruit is rotated while it is passing between the rollers 20 and 21 and this rotation is continued between the three rollers 20, 21 and 22 until the fruit is detached from its supporting branch or twig by the twisting off or twisting loose of the stem 31'. Obviously some pull may be exerted manually on the fruit during the twisting process and as soon as the fruit is detached it will move downwardly and be disposed of through the pliable chute 12. The entire device is light in weight and readily handled and applied to the fruit. The fruit drops as soon as it is detached from its branch or twig and the operator is not required to carry the weight of the fruit.

The rollers 20, 21 and 22 are highly compressible and readily conform to the shape and size of the fruit without danger of bruising or injuring the fruit and the downward convergence or taper of the rollers facilitates prompt disposal of the fruit.

As the fruit enters between the two fruit intake rollers 20 and 21 it will roll on the shield 29 until after the vertical axis of the fruit has passed inwardly beyond a plane which is common to the axis of the two rollers 20 and 21, this being the location where the peripheral portions of these two rollers are closest together. Preferably the shield 29 terminates at about the location of this plane which is common to the two axes of the rollers 20 and 21. This shield 29 makes it possible to take the fruit into the picking device from one side of the same between the two rollers 20 and 21 because it immobilizes the non-driven roller 21 and allows the roller 20 to roll the fruit into the picking device over the shield 29. Obviously if the incoming fruit contacted the non-driven roller 21 directly this roller would rotate and the fruit would not be drawn between the two rollers 20 and 21.

Rotation of the roller 20 can be instantly stopped at any time by exerting a push on the thumb piece or button 40.

The foregoing description and accompanying drawings clearly disclose a preferred embodiment of this invention but it will be understood that this disclosure is merely illustrative and that changes may be made within the scope and spirit of the following claims.

I claim:

1. In a fruit picking device, frame means including a base having a fruit discharge opening therein; a plurality of rollers of soft highly compressible material rotatively mounted by the frame means adjacent to and above said base around said fruit discharge opening on axes perpendicular to said base, at least two of said rollers being spaced apart a substantial distance, whereby they will function as fruit intake rollers between which fruit may enter; driving means connected with one of said two fruit intake rollers; and roller holding means carried by the frame means and cooperating with the other fruit intake roller stopping rotation of said other fruit intake roller while fruit is passing between it and the driven roller.

2. In a fruit picking device, frame means including a base having a fruit discharge opening therein; a plurality of rollers of highly compressible material rotatively mounted by said frame means adjacent to and above said base around said fruit discharge opening on axes substantially perpendicular to said base, at least two of said rollers being spaced apart a substantial distance whereby they will function as fruit intake rollers; means driving one of said fruit intake rollers; and a shield supported by said frame means and covering a portion of the circumference of the other fruit intake roller on the side thereof toward the driven roller.

3. In a fruit picking device, a base having a fruit discharge opening therein; a plurality of rollers of soft highly compressible material rotatively mounted by said base adjacent to and above said base around said fruit discharge opening on axes perpendicular to said base, at least two of said rollers being spaced apart a substantial distance whereby they will function as fruit intake rollers; roller driving means connected with one of said fruit intake rollers, the other fruit intake roller being non-driven; and a fruit contacting shield of flexible material supported from said base and disposed above said base and extending from the outside of said two fruit intake rollers into the space between said two fruit intake rollers and positioned adjacent the non-driven fruit intake roller and terminating approximately in a plane which is common to the axes of said two fruit intake rollers.

4. In a fruit picking device, a base having a fruit discharge opening therein; a plurality of sponge rubber rollers rotatively mounted adjacent to and above said base around said fruit discharge opening on axes substantially perpendicular to and supported from said base, at least two of said rollers being spaced apart a substantial distance, whereby fruit may enter therebetween; driving means connected with one of said two spaced apart rollers; and a fruit contacting flexible shield supported from the base and extending inwardly between the driven roller and another roller which is spaced therefrom and covering a portion of the circumference of the other roller in opposed relation to the driven roller.

5. In a fruit picking device, a base having a fruit discharge opening therein; three equally spaced apart rollers of highly compressible material rotatively mounted adjacent to and above said base around said fruit discharge opening on axes substantially perpendicular to and supported from said base; roller driving means connected with one of said rollers; and a fruit contacting flexible shield supported from the base and extending inwardly between the driven roller and another roller which is spaced therefrom and covering a portion of the circumference of the other roller in opposed relation to the driven roller.

6. In a fruit picking device, a base having a fruit discharge opening therein; a plurality of rollers of soft highly compressible material rotatively mounted adjacent to and above said base in spaced apart relation around said fruit discharge opening on axes substantially perpendicular to and supported from said base; at least two of said rollers being adapted to receive fruit therebetween and at least some of said rollers being convergently tapered from their outer ends toward said base; roller driving means connected with one of said rollers; and a fruit contacting flexible shield supported from the base and extending inwardly between the driven roller and another roller which is spaced therefrom and covering a portion of the circumference of the other roller in opposed relation to the driven roller.

7. In a fruit picking device, a base having a fruit discharge opening therein; a plurality of rollers of soft highly compressible material rotatively mounted by said base and positioned adjacent to and above said base in spaced apart relation around said fruit discharge opening, at least two of said spaced apart rollers being fruit intake rollers; a housing rigid with said base and extending partially around all of said rollers and having a fruit intake opening in the side thereof positioned in registration with the space between said two fruit intake rollers; roller driving means connected with one of said fruit intake rollers; and a fruit contacting shield of flexible material supported by said housing and extending between the two fruit intake rollers and positioned adjacent the non-driven fruit intake roller, whereby the non-driven fruit intake roller is held against rotation and fruit rolls on said shield while the fruit is being taken into the fruit picking device.

8. In a fruit picking device, a circular base having a fruit discharge opening therein; a plurality of tapered rollers of highly compressible material rotatively mounted by said base adjacent to and above said base with their axes substantially perpendicular to said base and positioned in spaced apart relation around said fruit discharge opening; the smaller ends of said tapered rollers being adjacent the base; an arcuate housing rigid with said base and extending partially around said rollers, said housing having a fruit intake opening in one side thereof registering with the space between two of said rollers and said housing being open at the top, whereby fruit hanging by a stem may pass through said fruit intake opening and between two of said rollers; a fruit contacting flexible shield supported by said housing alongside of said fruit intake opening and extending inwardly in close proximity to one of the rollers adjacent the fruit intake opening; and means driving the other roller adjacent said fruit intake opening, whereby the fruit will be rolled over the shield and between the rollers and will be rotated to twist the stem of the fruit.

References Cited in the file of this patent

UNITED STATES PATENTS

| | | |
|---|---|---|
| 1,233,904 | Patton | July 17, 1917 |
| 2,277,444 | McPhee | Mar. 24, 1942 |
| 2,287,545 | Wieck | June 23, 1942 |